May 4, 1965 R. R. BARNES 3,182,131
DOPPLER FREQUENCY SHIFT CORRECTION OF INFORMATION BAND FREQUENCIES IN A TRANSMITTED CARRIER SYSTEM USING A SINGLE PILOT SIGNAL
Filed July 17, 1962
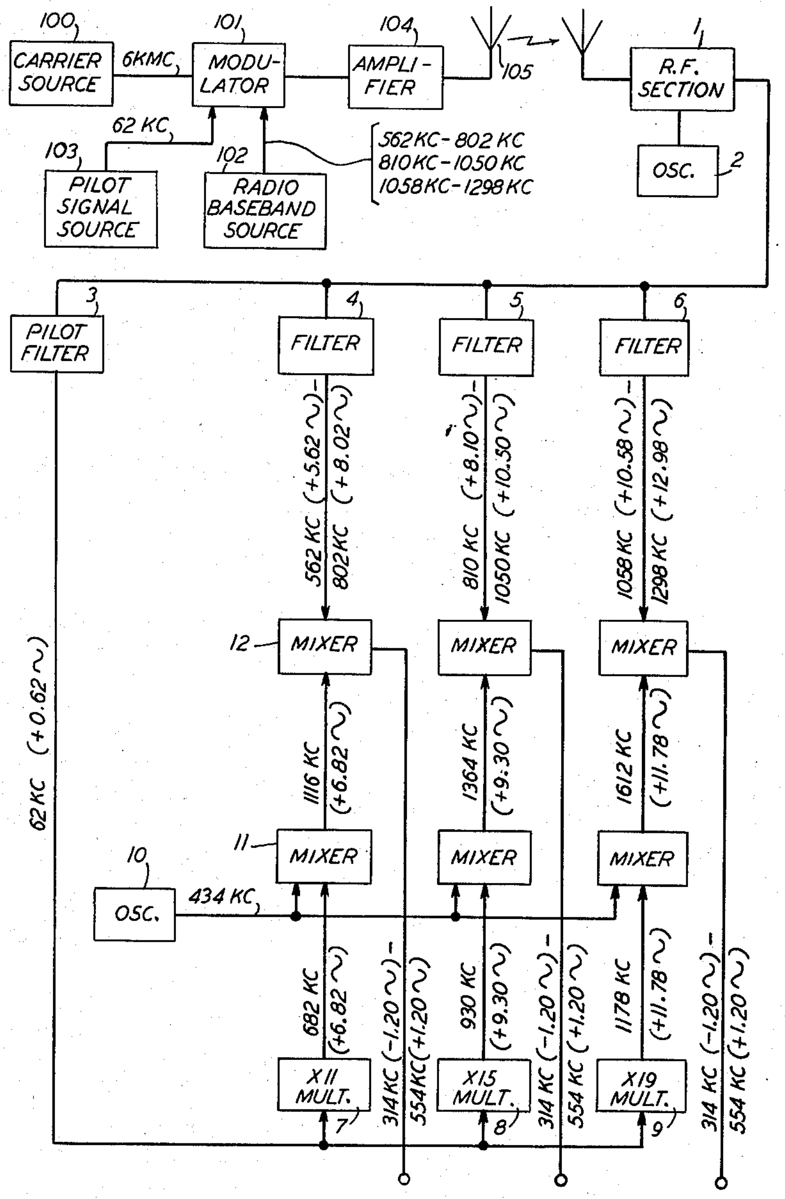
INVENTOR
R. R. BARNES
BY G. E. Hirsch Jr.
ATTORNEY 3,182,131

DOPPLER FREQUENCY SHIFT CORRECTION OF INFORMATION BAND FREQUENCIES IN A TRANSMITTED CARRIER SYSTEM USING A SINGLE PILOT SIGNAL

Richard R. Barnes, Stirling, N.J., assignor to Bell Telephone Laboratories, Incorporated, New York, N.Y., a corporation of New York Filed July 17, 1962, Ser. No. 210,459
4 Claims. (Cl. 179—15)

This invention relates to communication systems and more particularly to communication systems having a variable path length between receiving and transmitting stations.

In a communication system there may be a variable path length between the receiving and transmitting stations because of the movement of either the transmitter or receiver or of a moving intermediate repeater station. This is true in communications between a ground station and an aircraft and it is also true in satellite communication systems where the satellite is acting as a repeater station.

It is well known that whenever there is a variable path length in a communication system, there is a shift in the frequency of the signals coupling the transmitting and receiving stations, which is generally called "Doppler Frequency Shift." This Doppler frequency shift has a definite relationship to the frequency of the signals coupling the stations and the relative velocity or rate of change of path length between the stations. With the advent of supersonic aircraft this Doppler frequency shift can be of such a magnitude as to make the communication signal unusable at the craft in a standard type of receiver, because of the distortion caused by the unequal frequency shifts in the frequency band employed.

Additionally, as the speed of aircraft is increased, it may become necessary to control the flight of the craft by remote control by communication signals from a ground station. This communication signal would probably be a combination of pulses, such as is used in data communication, and, therefore, would be very sensitive to any shift in frequency.

It is noted that a frequency shift problem might also exist in a communication system as a result of inaccuracies in the frequencies of demodulating carriers. Such a frequency shift and its correction are discussed in United States Patents 2,724,742 and 2,778,877. This type of frequency shift is the same for all transmitted frequencies because it is not frequency dependent. On the other hand, the frequency shift attributable to changing path length or Doppler frequency shift bears a direct relationship to the frequency of the signals and therefore requires a different method for its correction.

Doppler frequency shift will occur at all frequencies, that is, at the carrier frequency and also at the modulating frequencies. Therefore if, for example, the carrier frequency is 6,000 megacycles per second and the modulating frequencies occupy a band between 300 and 500 kilocycles and the relative velocity between the transmitting and receiving stations of the system is 6704 miles per hour, there will be a large frequency shift of approximately 60,000 cycles per second attributable to the carrier frequency and a small frequency shift between three cycles per second and five cycles per second attributable to the modulating frequencies.

In any communication system having a Doppler frequency shift problem, an important consideration in the removal of this Doppler frequency shift is whether or not a component of the original carrier signal is present at the receiver.

The difference between systems having a carrier signal present at the receiver and those where the carrier is suppressed is a characteristic of the type of receiver required and the type of conversion employed. For example, in a communication system where the carrier is amplitude-modulated and only a single sideband is transmitted so that no carrier appears at the receiver, the initial conversion of frequencies within the receiver will not remove the large frequency shift attributable to the frequency of the carrier signal. When such a single-sideband signal is employed the large Doppler frequency shift presents a problem in addition to the small frequency shifts attributable to the modulating frequencies. A discussion of the large Doppler frequency shift problem and arrangements for its correction appear in my copending application Serial No. 210,460, filed July 17, 1962.

On the other hand, in a communication system where a component of the carrier is transmitted to the receiver, the initial conversion that takes place at the receiver will normally remove or compensate for the large Doppler frequency shift. For example, if the carrier is frequency modulated, the initial conversion at the receiver will generally be performed by a discriminator circuit which has a broadband characteristic. Due to this characteristic, the large Doppler frequency shift attributable to the carrier signal will not appear in the output of the discriminator circuit. However, the small frequency shifts attributable to the modulating frequencies are so related to the modulating frequencies that they will not be removed by the discriminator circuit, but will appear in the output thereof.

Therefore, it is an object of this invention to eliminate the Doppler shift occurring in communication systems having a variable path length between the transmitting and receiving stations and particularly to eliminate the small shifts referred to above as being caused by the modulating signal components, even in those systems in which the original carrier is transmitted.

In accordance with the invention, the Doppler frequency shift of the signal received by a receiver in a communication system having a variable path length is substantially canceled by providing a pilot signal in addition to the information-carrying signals which modulate the carrier. Both the pilot signal and the modulating signals will appear at the receiver with Doppler frequency shifts. The pilot signal and the modulating signals which may be composed of several discrete frequency bands are separated by filtering means and coupled to individual channels. The pilot signal is thereafter coupled into individual multiplier circuits which are located in the channels containing the information-carrying signals. The multiplier circuit increases the pilot frequency so that its frequency shift will be substantially equal to the average frequency shift of the band of modulating signals in that particular channel. The multiplied pilot signal is thereafter intermodulated with a locally generated signal having a selected frequency to produce a signal having a frequency greater than the highest frequency or less than the lowest frequency in the band of modulating signals and also having a frequency shift equal to the average frequency shift in the band of modulating signals. This last signal is then intermodulated with the band of modulating signals in that particular channel to produce an output signal having negligible frequency shift.

These and other features and advantages of the invention will appear more clearly and fully upon consideration of the following specification when taken in connection with the drawing, the single figure of which is a block diagram of a communication system, in accordance with the invention, including a transmitter and a receiver and illustrates the circuit arrangement to compensate for Doppler frequency shift.

The radio transmitter of the drawing comprises a carrier signal generator 100 which provides the carrier signal of the system. The output of generator 100 is applied to a modulator 101 for intermodulation with the information-carrying signals of the system. These information-carrying signals are represented as comprising three discrete bands of frequency and being supplied by a radio baseband source 102.

These information-carrying signals could occupy numerous bands of frequencies and be supplied by a radio baseband source such as the L3 Carrier System disclosed in the Bell System Technical Journal, volume 32, pages 779–832.

The carrier signal is additionally modulated by a 62 kc. pilot signal supplied by a pilot signal source 103. The carrier and at least one of its sidebands are amplified by amplifier 104 and radiated into space by antenna 105.

The radio receiver of the drawing comprises a radio-frequency section 1 and an oscillator 2 associated therewith to perform the first conversion of the received signals. The frequency of the output signal from the radio-frequency section 1 will be determined by the frequency of the carrier signal and the frequency of the modulating signals and the conversion frequency of oscillator 2.

For illustrative purposes it is assumed that the received signal comprises a carrier signal modulated by a plurality of information-carrying signals occupying discrete frequency bands and a pilot signal. It is further assumed that the carrier signal has a frequency of 6,000 megacycles per second and the modulating signals occupy a frequency band of 240 kilocycles per second and are spaced eight kilocycles per second apart and the pilot signal has a frequency of 62 kilocycles per second. It is additionally assumed that the relative velocity between the transmitting and receiving stations is approximately 6704 miles per hour.

Doppler frequency shift may be determined by the following equation:

$$f_D=\frac{Vf_c}{c}$$

where $f_D$ equals the Doppler frequency shift, V represents the relative velocity between the transmitting and receiving stations, $f_c$ represents the frequency of the signal coupling these stations and $c$ represents the velocity of light. At the above assumed frequencies and velocities it is seen from the equation that the Doppler frequency shift attributable to the carrier frequency is 60,000 cycles per second or one part in 100,000 cycles per second.

Therefore, this relative velocity will also produce a Doppler frequency shift of one part in 100,000 cycles per second at each modulating frequency and at the pilot signal frequency. The Doppler frequency shift attributable to the pilot signal and the band of information-carrying signals is shown in the drawing in parentheses adjacent to or immediately below the original frequencies of the pilot signal and the information-carrying signals. For example, the band of information-carrying signals between 562 kilocycles per second and 802 kilocycles per second will have a Doppler frequency shift of between 5.62 cycles per second and 8.02 cycles per second. This is similarly true for the other bands of information-carrying signals. The Doppler frequency shift at the pilot signal frequency of 62 kilocycles will be 0.62 cycle per second. The Doppler shift is shown as a constant for each signal. However, it is noted from the equation that it will vary as the relative velocity between the transmitting and receiving stations varies.

The signal appearing at the output of radio-frequency section 1 is separated into the pilot signal and the discrete frequency bands of the modulating signals by filters 3 through 6. It is to be noted that the bandwidth of the filters must be wide enough to permit the pilot signal or discrete frequency band plus any Doppler frequency shift that may be present to pass therethrough. Since the large Doppler frequency shift attributable to the carrier signal is removed by the initial conversion and does not appear at the input to the filters 3 through 6, it is necessary for these filters to have only a small increased frequency band to permit the passage of the pilot signal and modulating signals with their Doppler frequency shifts.

The pilot signal appearing at the output of filter 3 is increased in frequency by a multiplier circuit in each individual channel such as those represented by multipliers 7, 8 and 9. The pilot signal and its frequency shift are increased so that the frequency shift will be equal to the average frequency shift of the band of information-carrying signals appearing in a particular channel. For example, the band of information-carrying signals between 562 kilocycles per second and 802 kilocycles per second will have an average frequency shift of 6.82 cycles per second. Therefore it is necessary to increase the pilot signal and its frequency shift by a factor of 11 so that it will have a frequency shift of 6.82 cycles per second. Thereafter this pilot signal of increased frequency will be combined with the output of a local oscillator 10 in a mixer 11 to produce a signal having a frequency greater than the frequencies of the band of information-carrying signals by a preselected amount. For illustrative purposes, it is assumed herein that it is desirable to have the output of each channel fall between the frequencies of 314 and 554 kilocycles. Therefore, the output of mixer 11 will have a frequency of 1116 kilocycles plus a frequency shift of 6.82 cycles per second. This signal will be intermodulated with the information-carrying signal in mixer 12 to produce an output signal between 314 and 554 kilocycles having a reduced frequency shift which is centered about the midpoint of the frequency band.

Similarly, in the other information-carrying signal channels the pilot signal is sufficiently increased to have a frequency shift equal to the average frequency shift of the information-carrying signals and thereafter combined with the information-carrying signals to substantially cancel the Doppler frequency shift therein.

The frequency shift is reduced to 1.20 cycles per second at each end of the band of information-carrying signals in each channel. The overall frequency shift remaining is 2.40 cycles per second which is directly related to the bandwidth of the information-carrying signals, which was assumed to be 240 kilocycles per second. If this bandwidth is reduced, then the remaining frequency shift will also be reduced.

In all cases it is understood that the above-described embodiment is illustrative of only one of the many specific embodiments that represent applications of the invention. Numerous and varied other arrangements can readily be devised in accordance with these principles by those skilled in the art without departing from the spirit and scope of the invention.

For example, the invention applies equally well to one band or a plurality of bands of information-carrying signals. It is also applicable at frequencies other than those shown in the drawing.

What is claimed is:

1. In a communication system having a variable path length between a receiving terminal and a transmitting terminal, a carrier signal coupling said terminals, said carrier signal being modulated by a plurality or bands of information-carrying signals and a pilot signal frequency remote from said information bands of frequencies, said pilot signal and said bands of information-carrying signals being shifted in frequency by an amount determined by the rate of change of said path length between said terminals and the frequency of said carrier signal and the frequencies of said band of information-carrying signals, said receiving terminal comprising a filter means for separating said pilot signal and said bands of information-carrying signals into individual channels, means for simutaneously demodulating and correcting the frequency shifts of a plurality of information-carrying signal bands including a multiplier circuit connected to said filter means in said pilot signal channel for changing the shifted frequency of said pilot signal to the average value of the shifted frequency in each of said bands of information-carrying signals, a local oscillator, and means connected to said filter means in each of said information-band channels for intermodulating the multiplied pilot signal, the output of said oscillator and a corresponding band of information-carrying signals.

2. In a communication system having a variable path length between a transmitting terminal and a receiving terminal, a carrier signal coupling said terminals, said carrier signal being modulated by a plurality of information-carrying signals occupying discrete frequency bands and a pilot signal frequency remote from said information bands of frequencies, said pilot signal and each information-carrying signal being shifted in frequency by an amount determined by the rate of change of said path length between said terminals and the frequency of said carrier signal and the frequencies of said information-carrying signals, said receiving terminal comprising, a filter means for separating each frequency band and said pilot signal and coupling them to individual channels, a plurality of multiplier circuits connected in the pilot signal channel for changing the shifted frequency of said pilot signal to preselected frequencies, and means in each information-carrying signal channel for combining the information-carrying signal of that channel with a preselected frequency from the output of a multiplier circuit having a multiple of the frequency shift of the pilot signal that is approximately equal to the average frequency shift of the information-carrying signals in the frequency band of that particular channel.

3. In an electrical transmission system including a medium which proportionately shifts the frequency of each component of a transmitted signal, a transmitting terminal comprising means for modulating a carrier signal with a plurality of bands of information-carrying signal frequencies and a pilot signal frequency remote from said information band frequencies, a receiving terminal comprising means for separating said pilot signal and each of said plurality of information bands into individual channels, means connected to said separating means for converting said pilot signal frequency into a plurality of derived signals having a frequency shift equal to a corresponding frequency shift of a selected frequency within each respective band, and means for canceling the shift common to said selected frequency and said corresponding derived signal and for substantially reducing said shift of each frequency in each of said information-carrying bands.

4. In an electrical transmission system including a medium which shifts each frequency component of a transmitted signal by an amount proportional to the component frequency, a transmitting terminal comprising means for modulating a carrier signal with a plurality of bands of information-carrying signals and a pilot signal frequency remote from said information bands, and means for transmitting said modulated signal through said medium, a receiving terminal comprising means for separating each of said information bands and said pilot signal into individual channels, a plurality of multipliers connected to said separating means for converting said separated pilot signal frequency into a plurality of signals having a preselected frequency shift substantially equal to the average frequency shift of each of said information bands, a local oscillator having an output signal, and means connected to said local oscillator and said multipliers for totally canceling the shift in said information band signal having said average frequency shift and for substantially reducing the shift individual to each other of said information band signals including means in each information band channel for intermodulating said oscillator output signal and said converted pilot signal and said separated information band signal.

References Cited by the Examiner

UNITED STATES PATENTS

| | | | |
|---|---|---|---|
| 2,849,605 | 8/58 | Fickett et al. | 325—50 |
| 2,974,222 | 3/61 | Lawson | 325—17 |

DAVID G. REDINBAUGH, *Primary Examiner.*